Patented Aug. 21, 1951

2,564,763

UNITED STATES PATENT OFFICE 2,564,763

BAKED GOODS WITH CHEESE FLAVOR

Peter Kass, Great Neck, N. Y., assignor to Interchemical Corporation, New York, N. Y., a corporation of Ohio No Drawing. Application April 27, 1946, Serial No. 665,629

6 Claims. (Cl. 99—90).

This invention relates to the manufacture of leavened bakery goods and like products from dough made with wheat flour either white or whole wheat; graham, rye or mixtures of these with other recognized bakery constituents.

Heretofore, it has been the practice in the baking industry, particularly in the manufacturing of bread, to employ certain inorganic salts for their effect on the maturing of the dough during yeast fermentation by accelerating the fermentation process. It has also been known to add certain amino acids such as cysteine or cystine and the like in order to generally improve the baking qualities and particularly to enhance the crust coloring of the bread.

This invention relates particularly to the production of leavened bakery goods having a pronounced cheese-like flavor. In ordinary baking technology, cheese flavor is imparted to baked goods by means of a so-called strong cheese which is expensive by reason of the time required to produce and age such cheeses. By the method of this invention it is possible to obtain bakery goods having a cheese flavor without the employment of any cheese or according to a preferred modification of this invention, by the use of any mild domestic cheese.

It has been found that leucine and amino acids impart to bakery goods, when incorporated in a conventional dough formula, a pronounced cheese-like flavor.

An example of a conventional formula for the manufacturing of cheese crackers is as follows:

140 lbs. flour, containing ½ lb. ordinary baker's yeast, is mixed with sufficient water to make a workable dough. This mixture is allowed to mature for eighteen hours. After maturing, a mixture of 60 lbs. of flour, 15 lbs. lard, 50 lbs. of cheese of a special strong type, 1¼ lbs. of baking soda and 1½ lbs. salt is added to the dough mixture and allowed to mature for an additional five (5) hours. The kneaded dough is then rolled into thin strips, cut into desired shapes and baked.

It has been found that leucine may be added to this formula at either of two points, that is prior to the first maturing or during the second period. It has been found that no significant difference in the final flavor of the baked cracker can be observed whether the leucine is added in the first maturing stage or the second, as long as it is allowed to mature with the dough for a couple of hours. It has been found that the addition of from .2 to .7 lbs. of leucine or more added to the above formula and omitting the cheese, produces a cracker of satisfactory flavor. The amount of leucine does not appear to be critical beyond the saturation point of leucine in the water employed to form the dough. The addition of larger amounts of leucine merely causes it to crystallize on the surface without any apparent change. The addition of larger amounts of leucine or leucine-containing material may actually be desirable from a nutritional point of view since it provides a palatable food enriched with an essential food element.

It has been found that when leucine is used in place of cheese in the amounts indicated, the cheese-like flavor tends to disappear from the baked crackers if they are allowed to stand in the air in an open container for a period of two days or more. However, if a mild flavored domestic cheese is substituted in the above formula for the strong flavor type and in addition leucine is added as suggested, then the cheese-like flavor is not only intensified but becomes relatively permanent or at least until the ordinary expected staleness of the cracker hides the cheese-like flavor or makes it unpalatable. It has been found that even the mildest cheese, one which would not itself impart a cheese-like flavor to crackers, if used with leucine is useful for the purpose of this invention. The operation of the mild cheese in a formula of this sort may be likened to the use of a fixative in perfumery.

It has been found that it is entirely unnecessary to use an expensive purified crystalline leucine; hydrolysate of proteins, relatively rich in leucine are equally useful and in some cases, even superior because of an additional pleasant flavor imparted by them. It has been found that the acid hydrolysate of the purified corn protein, zein is particularly good as a flavoring agent. Tasting panels invariably select crackers baked according to the formula above containing the mild cheese and from .2 to .7 (or more) lbs. of zein hydrolysates for the outstanding taste in cheese-like flavor. Acid hydrolysates of casein are relatively good but enzymatic hydrolysates do not yield a particularly pleasant flavor. Soy bean hydrolysates may be also used but wheat gluten hydrolysates frequently yield a bitter off flavor when used in larger amounts.

In general, tasting panels will place a series of crackers baked with these protein hydrolysates in order of the leucine content of the initial protein when the cheese-like flavor is the only consideration.

It has also been noted that the brown color characteristics of baked goods is enhanced by the presence of amino acids provided reducing sugars are present in the dough or are allowed to form by fermentation. However, this is not considered especially noteworthy since it is known that other amino acids tend to have the same effect. The unusual aspect of the present invention lies primarily in the fact that only leucine or a protein hydrolysate relatively rich in leucine has the property of producing a strong cheese-like flavor.

By reason of the relatively small amount of the amino acid added to the dough mixture, it is possible to use leucine in any previously satisfactory baking formula without altering the amount of ingredients or other baking conditions. It is only required that the leucine should be allowed to mature with the dough at conventional maturing conditions.

I claim:

1. The process of making baked goods characterized by a pronounced cheese flavor, which includes incorporating leucine and a mild cheese, in itself incapable of flavoring the baked goods, with the ingredients of a leavened dough and fermenting the dough.

2. The process of making baked goods characterized by a pronounced cheese flavor, which includes incorporating a protein hydrolysate rich in leucine and a mild cheese, in itself incapable of flavoring the baked goods, with the ingredients of a leavened dough and fermenting the dough.

3. The process of making baked goods characterized by a pronounced cheese flavor, which includes incorporating an acid zein hydrolysate and a mild cheese, in itself incapable of flavoring the baked goods, with the ingredients of a leavened dough and fermenting the dough.

4. A dough mixture for baked goods having a pronounced cheese flavor, comprising flour, mild cheese, in itself incapable of flavoring the baked goods, and from 0.05 to 0.5% of leucine based on the flour weight.

5. A dough mixture for baked goods having a pronounced cheese flavor, comprising flour, mild cheese, in itself incapable of flavoring the baked goods, and a protein hydrolysate rich in leucine, containing at least 0.05% leucine based on the flour weight.

6. A dough mixture for baked goods having a pronounced cheese flavor, comprising flour, mild cheese, in itself incapable of flavoring the baked goods, and a zein hydrolysate, containing at least 0.05% leucine based on the flour weight.

PETER KASS.

REFERENCES CITED

The following references are of record in the file of this patent:

UNITED STATES PATENTS

| Number | Name | Date |
|---|---|---|
| 1,035,591 | Ikeda | Aug. 13, 1912 |
| 1,680,827 | Wagner | Aug. 14, 1928 |
| 1,680,865 | Fujii | Aug. 14, 1928 |
| 1,854,930 | Frey | Aug. 19, 1932 |
| 1,914,478 | Bonotto | June 20, 1933 |
| 2,280,031 | Weber | Apr. 14, 1942 |
| 2,434,087 | Weber | Jan. 6, 1948 |

FOREIGN PATENTS

| Number | Country | Date |
|---|---|---|
| 546,666 | Great Britain | July 24, 1942 |

OTHER REFERENCES

Moncrieff, The Chemical Senses (1944), Leonard Hill Ltd., London, page 357.